US008189848B2

(12) United States Patent
Lim

(10) Patent No.: US 8,189,848 B2
(45) Date of Patent: May 29, 2012

(54) SPEAKER MODULE FOR A PORTABLE TERMINAL

(75) Inventor: Ho-Yeong Lim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1034 days.

(21) Appl. No.: 12/130,288

(22) Filed: May 30, 2008

(65) Prior Publication Data

US 2008/0298628 A1 Dec. 4, 2008

(30) Foreign Application Priority Data

Jun. 1, 2007 (KR) ........................ 10-2007-0053901

(51) Int. Cl.
H04R 1/02 (2006.01)
H04M 1/00 (2006.01)
(52) U.S. Cl. ........ 381/386; 381/162; 381/191; 381/332; 455/575.1; 455/90.3
(58) Field of Classification Search ................... 381/386, 381/395, 162, 191, 332; 455/567, 575.1, 455/90.3
See application file for complete search history.

(56) References Cited

U.S. PATENT DOCUMENTS

| 2004/0097258 | A1* | 5/2004 | Lee et al. | 455/550.1 |
| 2005/0201587 | A1* | 9/2005 | Nagata et al. | 381/403 |
| 2006/0251281 | A1* | 11/2006 | Hyun et al. | 381/365 |
| 2006/0256020 | A1* | 11/2006 | Han et al. | 343/702 |
| 2007/0032258 | A1* | 2/2007 | Yamada et al. | 455/550.1 |
| 2008/0144879 | A1* | 6/2008 | Yang et al. | 381/386 |

FOREIGN PATENT DOCUMENTS

KR 10-2007-0038750 A 4/2007

* cited by examiner

Primary Examiner — Michael Trinh
(74) Attorney, Agent, or Firm — Jefferson IP Law, LLP

(57) ABSTRACT

A speaker module for a portable terminal is provided. The speaker module includes an upper case constituting a part of a module housing, a speaker unit, including a magnetic body, a voice coil and a vibration plate, formed in the upper case and a vibration motor, which is installed in the upper case and on one side of the speaker unit. The speaker module as structured above can secure a sufficient sound pressure and a sound volume in a portable terminal having a slim construction, makes it easier to secure space for installation within a portable terminal having a small size and slim construction in such a manner that a vibration motor, etc. are received and integrated in a module housing, and can improve the quality of sound in a portable terminal by achieving improved smoothness of output sound pressure in an audio frequency range.

12 Claims, 4 Drawing Sheets

SPEAKER MODULE FOR A PORTABLE TERMINAL

PRIORITY

This application claims the benefit under 35 U.S.C. § 119 (a) of a Korean patent application filed in the Korean Industrial Property Office on Jun. 1, 2007 and assigned Serial. No. 2007-0053901, the entire disclosure of which is hereby incorporated by reference.

BACKGROUND OF THE INVENTION

1. Field of the Invention

The present invention relates to a portable terminal. More particularly, the present invention relates to a speaker apparatus that can be embedded in a portable terminal, the speaker apparatus having a slim construction and being suitable for implementing multimedia functions.

2. Description of the Related Art

In general, the term "portable terminal" refers to an apparatus for performing mobile communication between users, or between a user and a service provider, through a mobile communication base station. With a portable terminal, various types of service content, including mobile banking, watching TV, on-line games, audio-on-demand as well as voice calls and sending text messages, can be performed.

Such portable terminals are classified into several different types depending on their physical structures. For example, bar-type terminals have one housing, at which an input/output device, such as a communication circuit, a transmitting unit, a receiving unit, etc., is installed. A flip-type terminal has a bar-type body, on which a flip cover is installed. And a folder-type terminal has a pair of housings that rotate so as to be opened/closed and includes input/output devices arranged on each housing. Sliding-type terminals have recently appeared and have become popular because they increase the convenience and portability of mobile terminals, and satisfy various demands of a user together with folder-type terminals.

In an early stage of system development, communication services performed using such portable terminals was limited to conventional communication services such as voice calls, sending short text message, etc. However, communication services supported by such portable terminals has recently included multimedia services such as games, music, the sending of moving picture files, online games, etc. as well as digital multimedia broadcasting (hereinafter, referred to as DMB).

According to the recent tendency of recognizing multimedia capabilities of a portable terminal as an important function, there is a high level of effort in improving the output sound of a portable terminal. An example of such an effort is Korean Patent No. 594,064 issued on Jun. 24, 2006 (and its associated US Pre-Grant Publication No. 2004/0097258 published on May 20, 2004, the entire disclosures of both of which are hereby incorporated by reference) which discloses a portable terminal including a speaker apparatus supplying stereo sound. The disclosed portable terminal has a structure where a speaker apparatus is installed at a hinge-assembled part of a folder-type terminal.

Meanwhile, if portability of a terminal is considered, it is desirable for the size of the portable terminal to be reduced. However, since various multimedia functions are now provided by the portable terminal, a sufficient size of a display apparatus has to be secured so that the effort in size-reduction of the portable terminal has been focused on reducing a thickness of the portable terminal. Therefore, it is not possible to secure space within a hinge-assembled part of the portable terminal at which a speaker apparatus can be installed as described above.

Furthermore, in order to enjoy multimedia services, sufficient sound volume has to be secured and be uniformly output within an audio frequency range (20 Hz~20 kHz). However, it is much more difficult to secure such conditions of output sound in a portable terminal of a slim construction. That is, resonance space has to be secured within the speaker apparatus in order to obtain sufficient sound volume and uniform output of sound, but securing such resonance space is difficult in a portable terminal of a slim construction. Furthermore, a speaker unit, which is manufactured as a separate component by a speaker manufacturer, is supplied to the portable terminal manufacturers. As a result, there is an increasing difficulty in that space for installation of a pre-manufactured speaker unit as well as resonance space has to be secured when manufacturing portable terminals.

Also, the structure of a speaker unit, which allows the volume of received bell sounds, etc. to be secured in a state of a folder-type terminal being folded, has been suggested. However, it is also difficult to secure sufficient resonance space within the structure of the speaker unit so that a separate resonance case receiving the speaker unit has to be installed within the portable terminal. Furthermore, although it is possible to secure resonance space in such a manner that a speaker unit is received in a separate resonance case and the separate resonance case is installed in the portable terminal, it is difficult to secure space for installation of the speaker module having such a structure within a portable terminal having a slim construction.

SUMMARY OF THE INVENTION

An aspect of the present invention is to address the above-mentioned problems and/or disadvantages and to provide at least the advantages described below. Accordingly, an aspect of the present invention is to provide a speaker module having a reduced size and a slim construction that can be easily embedded in a portable terminal and that secures sufficient resonance space.

Another aspect of the present invention is to provide a speaker module that is suitable for performing multimedia services.

In accordance with an aspect of the present invention, a speaker module is provided. The speaker module includes an upper case constituting a part of a module housing, a speaker unit, including a magnetic body, a voice coil, and a vibration plate, in the upper case and a vibration motor, which is installed in the upper case and positioned at one side of the speaker unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
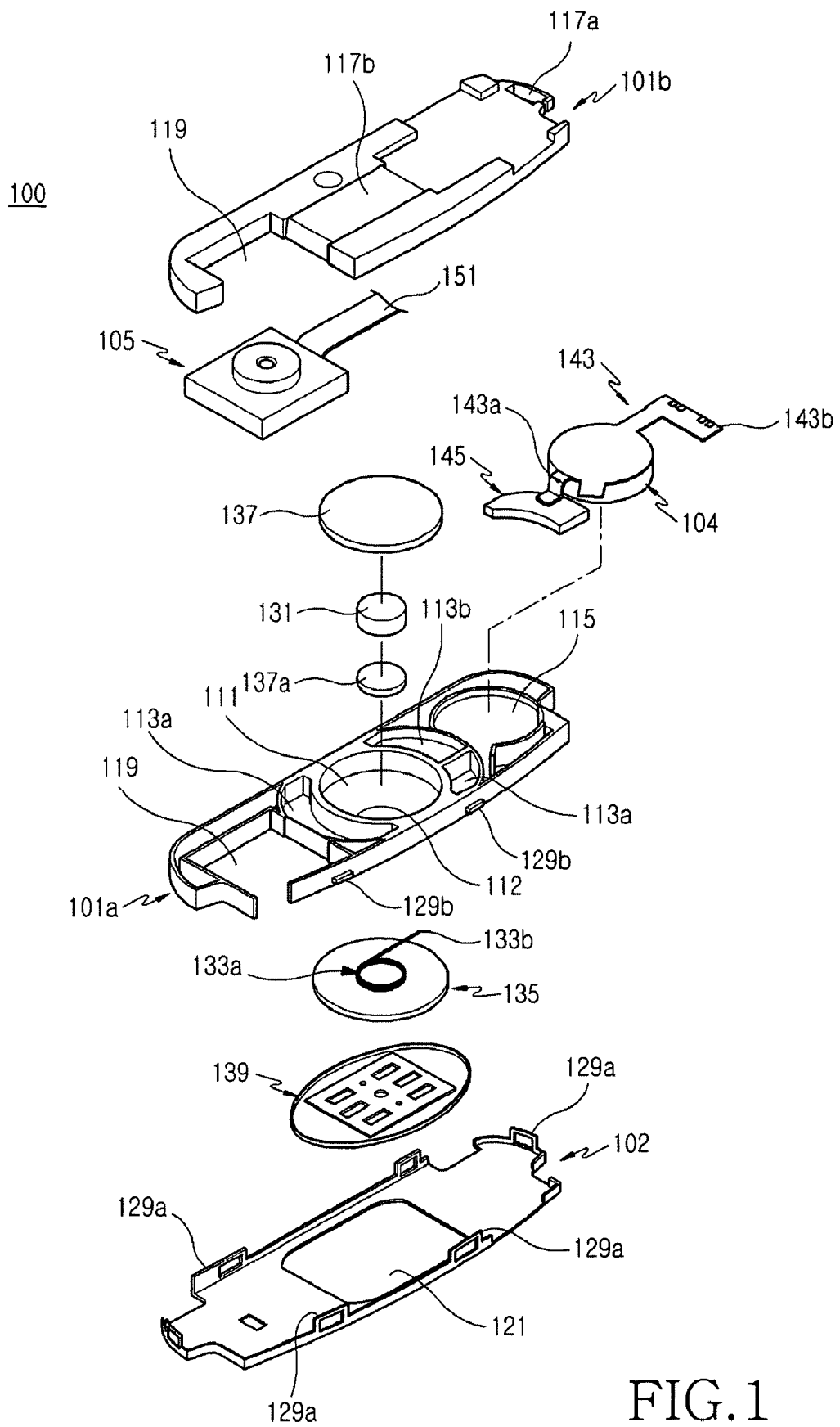
FIG. 1 is an exploded perspective view of a speaker module of a portable terminal according to an exemplary embodiment of the present invention.
Figure 2:
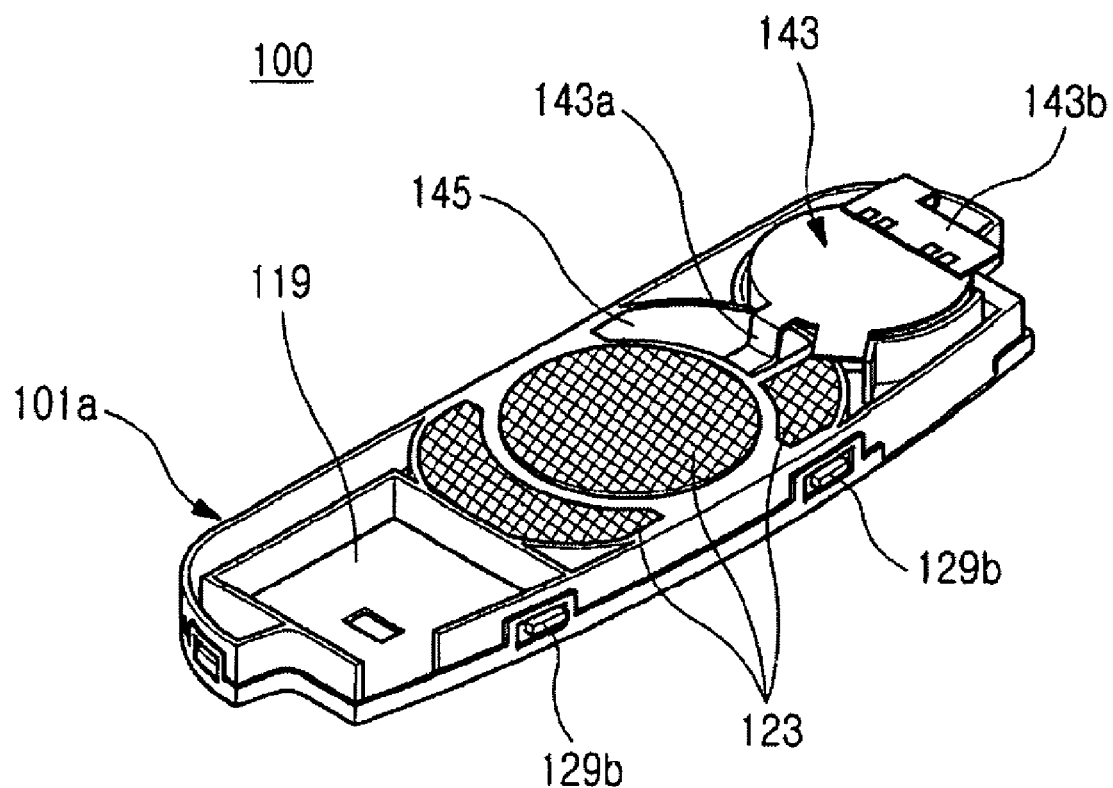
FIG. 2 is a perspective view of the speaker module shown in FIG. 1, in which a speaker unit is installed at an upper case of the speaker module according to an exemplary embodiment of the present invention.
Figure 3:
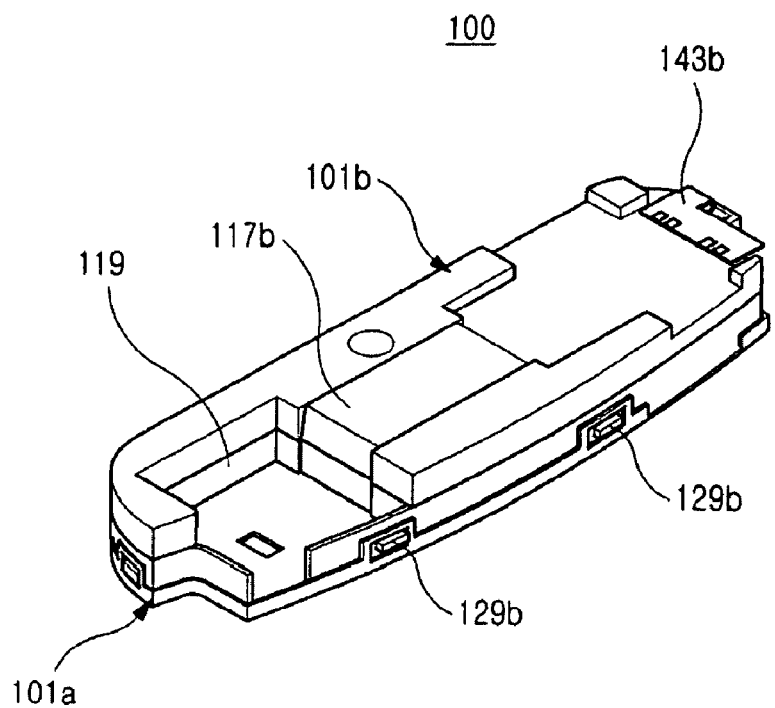
FIG. 3 is a perspective view of the speaker module shown in FIG. 1, in which the speaker module is assembled according to an exemplary embodiment of the present invention.
Figure 4:
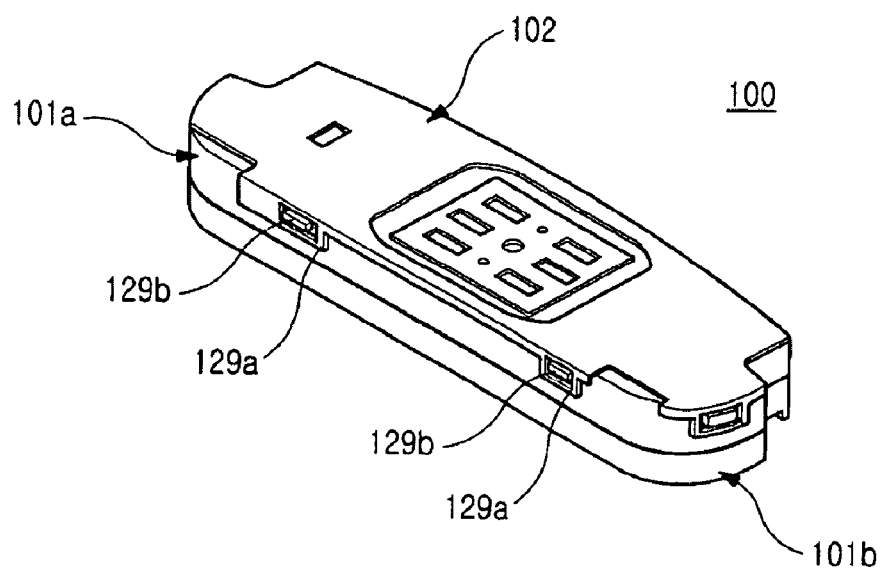
FIG. 4 is another perspective view of the speaker module shown in FIG. 3 according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As illustrated in FIGS. 1 to 4, in a speaker module 100 of a portable terminal according to an exemplary embodiment of the present invention, a speaker unit including a magnetic body 131, a voice coil 133a, and a vibration plate 135 is installed at a module housing having upper and lower cases 101a and 101b, and each space, in which other components can be installed, is secured at both sides of the speaker unit within the module housing. In another exemplary embodiment, in addition to the speaker unit installed within the module housing, a vibration motor 104 and a camera unit 105 are provided. Additionally, a resonance space 113a is formed between the speaker unit and the vibration motor 104, and between the speaker unit and the camera unit 105.

The module housing includes the upper case 101a and the lower case 101b. That is, the upper case 101a constitutes a part of the module housing, and the lower case 101b constitutes the remaining part of the module housing.

The upper case 101a has a structure for receiving the camera unit 105, the speaker unit, and the vibration motor 104 in such a manner that each outer surface of these units is surrounded by the structure. Each resonance space 113a is formed between a space for receiving the camera unit 105 and a space for receiving the speaker unit, and between space for receiving the vibration motor 104 and a space for receiving the speaker unit. An opening 111 allowing the speaker unit to be installed therein is formed at the central portion of the upper case 101a. The resonance space 113a is formed at the periphery of the opening 111, and a circuit board 145, which is used for inputting sound signals to the voice coil 133a of the speaker unit, can be installed at a portion 113b of the periphery of the opening 111. Each supporting rib 112 is formed between the opening 111 and each resonance space 113a so as to protect the magnetic body 131 and the voice coil 133a by surrounding them.

A fixing groove 115 is formed at one side of the opening 111, and a receiving groove 119 is formed at the other side thereof. The vibration motor 104 is received in the fixing groove 115, and the camera unit 105 is received in the receiving groove 119. At this time, the receiving groove 119 functions as a part of the lower case 101b so that the receiving groove 119 can provide a space for installation of the camera unit 105.

The magnetic body 131, the voice coil 133a, and the vibration plate 135, which are included in the speaker unit, are installed in the opening 111. The voice coil 133a is attached to the vibration plate 135, which is installed at one end of the opening 111, so that the voice coil 133a is simultaneously received in the opening 111. A yoke 137 is attached to the other end of the opening 111 so as to install the magnetic body 131, and the magnetic body 131 having one surface attached to the yoke 137 is positioned within the opening 111. At this time, a ring-type magnetic body (not shown) can be attached to the edge of the yoke 137. Furthermore, a yoke 137a can be attached to the other surface of the magnetic body 131 so as to face the vibration plate 135.

In an exemplary embodiment, each yoke 137 and 137a is attached to a surface of the magnetic body 131, and one of the yokes (e.g. 137) is attached to the edge of the other end of the opening 111. At this time, the yoke 137 attached to the other end of the opening 111 may have holes for discharging sound generated due to vibration of the vibration plate 135. Furthermore, in order to allow sound to be uniformly output through such holes and prevent alien substances from entering the opening 111, a speaker grill 123 can be attached to the yoke 137.

An electric field generated when a sound signal is applied to the voice coil 133a vibrates the vibration plate 135 through reciprocal operation respective to a magnetic field of the magnetic body 131 so that sound corresponding to the applied sound signal is output. At this time, the yokes 137 and 137a maintain the direction of the magnetic field of the magnetic body 131, thereby stabilizing the output operation of the speaker unit.

The vibration plate 135 is thin enough to vibrate due to reciprocal operation between the magnetic field of the magnetic body 131 and the electric field of the voice coil 133a. Therefore, in order to protect the vibration plate 135, a protecting member 139, which may be made from a metal or other structurally protective material, is attached to an outer peripheral surface of the upper case 101a. The protecting member 139 substantially closes the opening 111 so as to prevent the vibration plate 135 from being polluted or deteriorated from an outer environment.

A plurality of speaker holes is formed in the protecting member 139 so that sound generated due to vibration of the vibration plate 135 is output through the speaker holes. Herein, another speaker grill (not shown) can be attached to an outer surface of the protecting member 139. Also, speaker grills 123, etc. may be attached to inner surfaces of the upper case 101a, which form each resonance space 113a, so that effective resonance occurs within the module housing.

When a signal indicating the receiving of a message or a voice call is received in a state where a portable terminal is set in an etiquette mode, the vibration motor 104 is used for notifying a user that a message, voice call etc. has been received. The vibration motor is operated in such a manner to generate a receiving signal, such as a vibration, instead of bell or other audible sound. The vibration motor 104 is mounted in the fixing groove 115, and has a flexible printed-circuit board (FPC) 143, which is used for connecting the vibration motor 104 with a main board of the terminal, installed therein. At this time, a circuit board 145, to which a signal element 133*b* of the voice coil 133*a* is connected, is connected with the main board of the terminal through the FPC 143. Therefore, the FPC 143 includes a first connecting circuit part 143*a* connected to the circuit board 145 and a second connecting circuit part 143*b* connected with the main board of the terminal.

The magnetic body 131 of the speaker unit and the vibration motor 104 are closed by the lower case 101*b*, and the second connecting circuit part 143*b* extends out of the module housing through a slit 117*a* formed at the lower case 101*b*. This will be described in more detail below.

A metallic case 102 is assembled with an outer surface of the upper case 101*a* so as to allow the module housing to be firmly formed. A through hole 121 is formed in the metallic case 102 so as to expose the speaker holes of the protecting member 139 and receive the speaker grill attached to the protecting member 139. In order to attach the metallic case 102 to the upper case 101*a*, an adhesive can be used to attach the upper case 101*a* and the metallic case 102. In an exemplary implementation, the adhesive is selected for qualities such as a shock-absorbing property, a sealing property, and an insulating property. In an exemplary implementation, PORON® tape may be used. The metallic case 102 is fixedly attached to the upper case 101*a* by means of the adhesive. The adhesive prevents sound output through speaker holes of the protecting member 139 from flowing out between the upper case 101*a* and the metallic case 102. As such, output sound does not flow out between the upper case 101*a* and the metallic case 102 so that vibration of the upper case 101*a* and the metallic case 102 can be prevented.

In addition, assembling pieces 129*a* are formed on the metallic case 102, and the assembling protuberances 129*b* may be formed on the upper case 101*a*. When each assembling protuberance 129*b* is assembled with each assembling piece 129*a* after the metallic case 102 makes close contact with the upper case 101*a*, the metallic case 102 compresses the adhesive disposed between the metallic case 102 and the upper case 101*a* while making further close contact with the upper case 101*a*. As a result, the metallic case 102 is fixedly assembled with the upper case 101*a*, and a gap between the upper case 101*a* and the metallic case 102 is substantially sealed.

The lower case 101*b* is assembled with the upper case 101*a* while facing it so that the module housing is completely formed. At this time, the lower case 101*b* closes components of the speaker module, such as the magnetic body 131, and the vibration motor 104, and forms the receiving groove 119, in which the camera unit 105 is mounted. The slit 117*a* is formed at one side end of the lower case 101*b* so as to provide a space allowing the second connecting circuit part 143*b* of the FPC 143 to be drawn.

In addition, a wiring recess or groove 117*b* is formed on an outer surface of the lower case 101*b*. The wiring groove 117*b* extends to the receiving groove 119 so as to provide a wiring channel of an FPC 151 connected with the camera unit 105. The FPC 151 connected with the second connecting circuit part 143*b* and the camera unit 105 passes through another FPC or another printed circuit board so as to be connected with the main board of the portable terminal.

In an exemplary implementation, a speaker module 100, structured as described above, is received in one end of a housing of a portable terminal, outputs the voice of a user in a voice call mode, and outputs corresponding sounds in a multimedia mode, such as a game mode, etc. At this time, sound generated due to vibration of the vibration plate 135 is output in a state where sound pressure and sound volume are improved through the resonance space 113*a* formed within the module housing.

In general, in a small sized apparatus such as a portable terminal, quality of sound output when multimedia files, etc. are regenerated depends on the quality of sound in a low sound range (i.e. sound in a low frequency), which is output by a speaker module. It is impossible to achieve high quality of sound in a simple manner, such as by simply increasing the output sound pressure in the low sound range. That is, if output sound pressure in the low sound range is increased, output sound pressure in a high sound range is also increased. As a result, the quality of sound is not actually improved, but only the overall sound volume increases. Accordingly, in order to improve the quality of sound, the smoothness of a sound pressure output in an overall range of an audio frequency band has to be improved.

Figure 5:
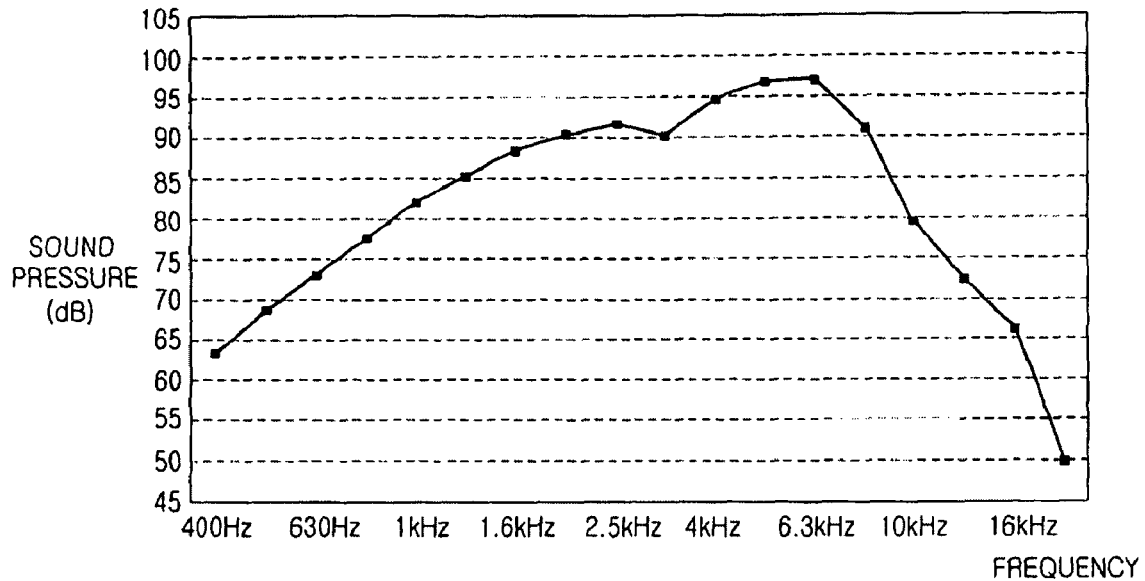
FIG. 5 is a graph showing a frequency response characteristic of a conventional speaker module.
Figure 6:
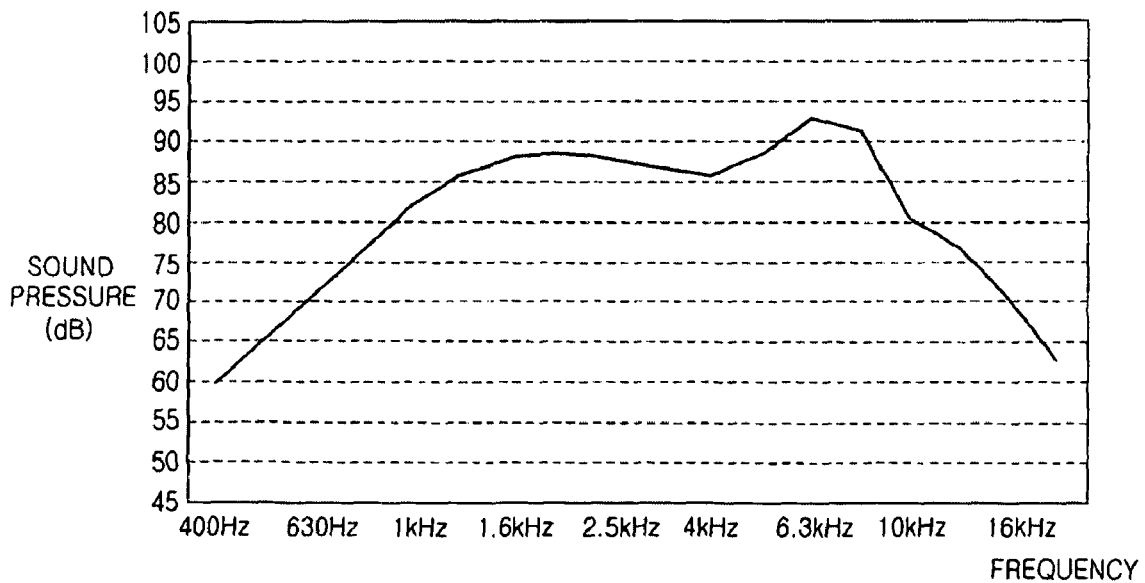
FIG. 6 is a graph showing a frequency response characteristic of the speaker module shown in FIG. 1 according to an exemplary embodiment of the present invention.

FIG. 5 is a graph showing sound output of a portable terminal, in which a speaker module including a conventional speaker unit received in a resonance case is mounted, and FIG. 6 is a graph showing sound output of a portable terminal, in which a speaker module 100 according to an exemplary embodiment of the present invention is mounted.

In an audio frequency range of sound output by the speaker module, output sound pressure of the conventional speaker module is distributed in the range from about 50 dB to about 97 dB. In comparison, output sound pressure of the speaker module 100 according to an exemplary embodiment of the present invention is distributed in the range from about 60 dB to 93 dB.

Particularly, it can be recognized that, in the high sound range from about 1.6 kHz to 9 kHz, sound pressure of the speaker module according to an exemplary embodiment of the present invention is lowered in comparison with the conventional speaker module so that smoothness of output sound pressure is improved in the overall audio frequency range. That is, deviation of sound pressure between the low sound range and the high sound range is improved so that the low sound range is strengthened in comparison with the high sound range. Therefore, the quality of output sound of a size-reduced apparatus such as a portable terminal, etc. can be improved.

As described above, a speaker module according to an exemplary embodiment of the present invention secures a resonance space within a module housing so that a sufficient sound pressure and a sound volume can be secured in a portable terminal having a slim construction. Also, there is an advantage in that space for installation can be secured in a portable terminal having a small size and slim construction in such a manner that a vibration motor, a camera unit, etc. are received and integrated in a module housing of the portable terminal. Furthermore, the quality of sound in a portable terminal can be improved by achieving improved smoothness of output sound pressure in an audio frequency range.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A speaker module of a portable terminal, comprising:
   an upper case constituting a part of a module housing;
   a speaker unit, comprising a magnetic body, a voice coil and a vibration plate, formed in the upper case;
   a vibration motor installed in the upper case and positioned at a first side of the speaker unit;

a first resonance cavity formed between the vibration motor and the speaker unit; and a second resonance cavity formed on a side of the speaker unit opposite to a side of the speaker unit facing the vibration motor, wherein the first resonance cavity and the second resonance cavity are vacant.

2. The speaker module of claim 1, further comprising:
an opening formed in the upper case for receiving the speaker unit; and
a protecting member attached to the opening and facing the vibration plate.

3. The speaker module of claim 2, wherein the protecting member comprises a metallic material.

4. The speaker module of claim 2, further comprising:
a speaker grill attached to the protecting member; and
speaker holes formed in the protecting member to allow sound generated due to vibration of the vibration plate to pass through the speaker holes,
wherein the protecting member is disposed between the vibration plate and the speaker grill.

5. The speaker module of claim 4, further comprising a metallic case attached to an outer surface of the upper housing,
wherein the metallic case includes a through hole for receiving the speaker grill.

6. The speaker module of claim 1, further comprising:
a support rib formed in the upper case to surround the magnetic body and the voice coil; and
a yoke attached to the support rib and attached to one surface of the magnetic body while facing the magnetic body.

7. The speaker module of claim 1, further comprising a lower case assembled with the upper case to form a remaining part of the module housing,
wherein the lower case is assembled with the upper case to at least partially enclose the magnetic body and the vibration motor.

8. The speaker module of claim 7, further comprising:
a slit formed on one side of the lower case; and
a flexible printed circuit electrically connected to the voice coil and the vibration motor,
wherein the flexible printed circuit extends through the lower case via the slit so as to exit the module housing.

9. The speaker module of claim 1, further comprising a first receiving hole formed in the module housing and positioned at a second side of the speaker unit, wherein a camera unit is installed in the receiving hole.

10. The speaker module of claim 9, further comprising a lower case assembled with the upper case to form a remaining part of the module housing, wherein the lower case includes a second receiving hole such that the first and second receiving holes together receive the camera unit.

11. The speaker module of claim 10, further comprising:
a wiring recess formed on an outer surface of the lower case; and
a flexible printed circuit extending from the camera unit,
wherein the flexible printed circuit extending from the camera unit is located at least partially in the wiring recess.

12. The speaker module of claim 1, wherein the speaker module is received in one end of a housing constituting the portable terminal, outputs a voice of a partner in a voice call mode, and outputs corresponding sounds in at least one of a multimedia mode and a game mode.

* * * * *